(12) United States Patent
Lee et al.

(10) Patent No.: US 10,558,071 B2
(45) Date of Patent: Feb. 11, 2020

(54) MULTILAYER STRUCTURE, METHOD FOR PRODUCING THE SAME AND TOUCH SENSITIVE DISPLAY USING THE SAME

(75) Inventors: Yuhwen Lee, Hsinchu County (TW); Xianbin Xu, Fujian (CN); Qiong Yuan, Jiangxi (CN); Fengming Lin, Fujian (CN)

(73) Assignee: TPK TOUCH SOLUTIONS (XIAMEN) INC., Fujian (CN)

( * ) Notice: Subject to any disclaimer, the term of this patent is extended or adjusted under 35 U.S.C. 154(b) by 1402 days.

(21) Appl. No.: 13/634,918

(22) PCT Filed: Sep. 7, 2010

(86) PCT No.: PCT/CN2010/076655
§ 371 (c)(1),
(2), (4) Date: Oct. 1, 2012

(87) PCT Pub. No.: WO2011/113263
PCT Pub. Date: Sep. 22, 2011

(65) Prior Publication Data
US 2013/0033458 A1  Feb. 7, 2013

(30) Foreign Application Priority Data
Mar. 14, 2010  (CN) .......................... 2010 1 0130377

(51) Int. Cl.
| | |
|---|---|
| G09G 3/36 | (2006.01) |
| B32B 37/12 | (2006.01) |
| B32B 27/08 | (2006.01) |
| B32B 7/12 | (2006.01) |
| G06F 3/042 | (2006.01) |
| B32B 37/06 | (2006.01) |
| G02F 1/1333 | (2006.01) |
| C09J 7/22 | (2018.01) |
| C09J 7/38 | (2018.01) |
| C09J 7/10 | (2018.01) |

(52) U.S. Cl.
CPC ............ *G02F 1/13338* (2013.01); *C09J 7/10* (2018.01); *C09J 7/22* (2018.01); *C09J 7/38* (2018.01); *C09J 2201/128* (2013.01); *C09J 2201/134* (2013.01); *C09J 2201/36* (2013.01); *C09J 2201/606* (2013.01); *C09J 2203/318* (2013.01); *C09J 2467/006* (2013.01); *G02F 2202/28* (2013.01); *Y10T 156/10* (2015.01); *Y10T 428/264* (2015.01); *Y10T 428/266* (2015.01); *Y10T 428/2813* (2015.01)

(58) Field of Classification Search
None
See application file for complete search history.

(56) References Cited

U.S. PATENT DOCUMENTS

| | | | | |
|---|---|---|---|---|
| 5,478,639 A | * | 12/1995 | Kawaguchi | ................ C09J 7/04 428/354 |
| 6,211,261 B1 | * | 4/2001 | Hosokawa | ............ C08F 283/10 522/129 |

(Continued)

*Primary Examiner* — Ian A Rummel
(74) *Attorney, Agent, or Firm* — Cooper Legal Group, LLC

(57) ABSTRACT

The present invention is directed to an optical bonding apparatus with multiple layer structure including a pressure sensitive bonding layer and a thermal flow pressure sensitive bonding layer. The thermal flow pressure sensitive bonding layer is used for bonding to a rough surface of an object and superposing on the pressure sensitive bonding layer.

9 Claims, 3 Drawing Sheets

(56) References Cited

U.S. PATENT DOCUMENTS

| | | | | |
|---|---|---|---|---|
| 2003/0232192 | A1* | 12/2003 | Kishioka | C09J 7/02 428/354 |
| 2009/0035563 | A1* | 2/2009 | Husemann | C09J 7/0246 428/337 |
| 2009/0096765 | A1* | 4/2009 | Kuo | G02F 1/13338 345/174 |
| 2009/0110861 | A1* | 4/2009 | Sherman | C09J 7/0207 428/41.8 |
| 2010/0018755 | A1* | 1/2010 | Tatsuzawa | C09J 7/02 174/254 |
| 2012/0325402 | A1* | 12/2012 | Suwa | B32B 37/1207 156/275.5 |

* cited by examiner

MULTILAYER STRUCTURE, METHOD FOR PRODUCING THE SAME AND TOUCH SENSITIVE DISPLAY USING THE SAME

BACKGROUND OF THE INVENTION

Field of the Invention

The present invention generally relates to an optical bonding apparatus, and more particularly, to an optical bonding apparatus with multiple layer structure, a method for producing the same and a touch sensitive display using the same.

Description of the Related Art

A liquid crystal display (LCD) is a thin, flat electronic visual display that uses the light modulating properties of liquid crystals (LCs). LCs do not emit light directly. Generally, an LCD apparatus includes a display substrate, a liquid crystal drive substrate and a liquid crystal apparatus sealed between the display side substrate and the liquid crystal drive side substrate. For the liquid crystal display apparatus, the display is carried out by electrically controlling the liquid crystal drive side substrate to change the amount of transmitted light from the light source.

The gap between the display side substrate and the liquid crystal drive side substrate is filled with LCs. As a result, the thickness of the gap is the same as the thickness of the liquid crystal layer.

The distance between the display side substrate and the liquid crystal drive side substrate may have inconsistencies. Such inconsistency will cause the existence of stress in the LCD when the LCs are sealed in the gap. The stress will lead to the variation of the thickness of the liquid crystal layer. As a result, a mura condition develops.

Mura is the phenomenon described as follows when an LCD is illuminated, an uneven color line or a color block may be appear on the LCD screen. The color line or the color block is yellow when the background is white, and the color line or the color block is white when the background is gray.

Generally, the LCD technology is combined with touch sensitive technology to provide easy input to a given system. A touch sensitive display device generally includes an LCD and a transparent touch panel placed thereon. The distance between the LCD and the touch panel can not be guaranteed to be even, which will amplify the stress, and at the same time increase the chance of mura condition.

SUMMARY OF THE INVENTION

In order to reduce or eliminate the development of the mura phenomenon, an optical bonding apparatus with multiple layer structure, a method for producing the same, and a touch sensitive display using the same are provided.

An optical bonding apparatus with multiple layer structure includes a pressure sensitive bonding layer and a thermal flow pressure sensitive bonding layer. The thermal flow pressure sensitive bonding layer is used for bonding to a rough surface of an object and superposing on the pressure sensitive bonding layer.

An optical bonding apparatus with multiple layer structure includes a pressure sensitive bonding layer, a thermal flow pressure sensitive bonding layer, and an organic substrate. The thermal flow pressure sensitive bonding layer is used for bonding to a rough surface of an object and superposing on the pressure sensitive bonding layer. The organic substrate is placed between the pressure sensitive bonding layer and the thermal flow pressure sensitive bonding layer. Two surfaces of the organic substrate bond to the pressure sensitive bonding layer and the thermal flow pressure sensitive bonding layer respectively.

A method for producing an optical bonding apparatus includes the following steps: providing a pressure sensitive bonding layer and superposing a thermal flow pressure sensitive bonding layer for bonding to a rough surface of an object on the pressure sensitive bonding layer.

A method for assembling a display device includes the following steps: producing an optical bonding composition with a pressure sensitive bonding layer and a thermal flow pressure sensitive bonding layer bonded together, and placing the optical bonding composition between a touch panel and an LCD.

A touch sensitive display includes a touch panel, an LCD panel facing the touch panel, and an above mentioned optical bonding apparatus being placed between the touch panel and the LCD panel for bonding the touch panel and the LCD panel. The thermal flow pressure sensitive bonding layer is bonded to the rough surface of the LCD panel or of the touch panel.

DETAILED DESCRIPTION OF THE INVENTION

The detailed description of the present invention will be discussed in the following embodiments, which are not intended to limit the scope of the present invention, but still can be adapted for other applications. While drawings are illustrated in details, it is appreciated that the quantity of the disclosed components could be greater or less than that disclosed, except those components with expressly restricting amount.

Figure 1:
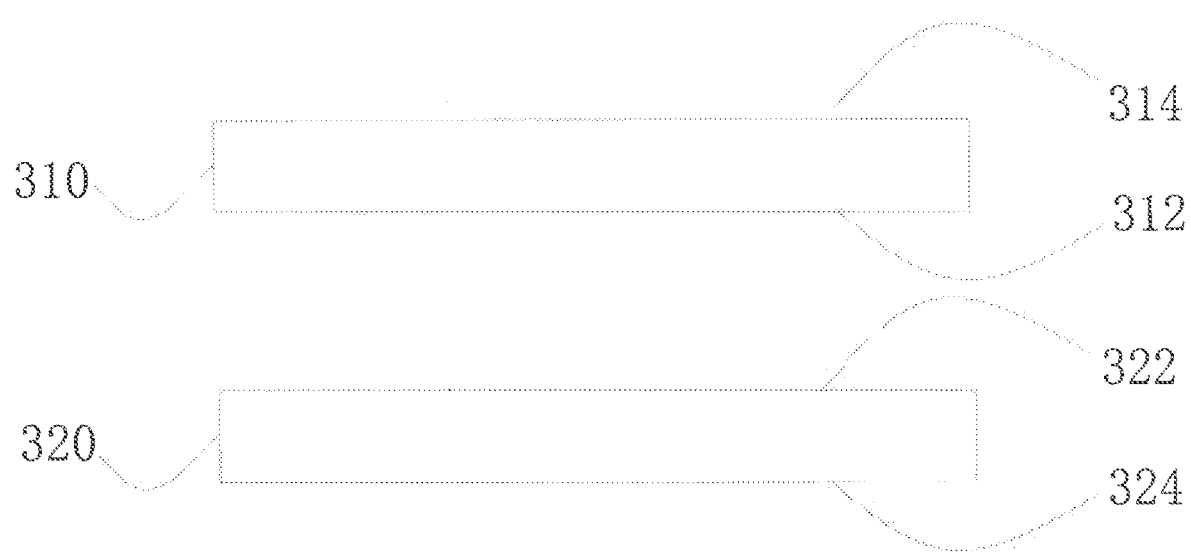
FIG. 1 shows an exploded view of an optical bonding apparatus with multiple layer structure in accordance with a first preferred embodiment of the present invention.
Figure 2:
FIG. 2 shows a side view of an optical bonding apparatus with multiple layer structure in accordance with the first preferred embodiment of the present invention.

Referring to FIG. 1 and FIG. 2, an exploded view and side view of an optical bonding apparatus with multiple layer structure are shown respectively according to a first embodiment of the present invention. The optical bonding apparatus 30 includes a pressure sensitive bonding layer 310 and a thermal flow pressure sensitive bonding layer 320 for bonding to a rough surface of an object (not shown). The thermal flow pressure sensitive bonding layer 320 is superposed on the pressure sensitive bonding layer 310.

The pressure sensitive bonding layer 310 has a first surface 312 and a second surface 314. The thermal flow pressure sensitive bonding layer 320 has a third surface 322 and a forth surface 324. The pressure sensitive bonding layer 310 is superposed on the thermal flow pressure sensitive bonding layer 320 with the first surface 312 and the third surface 322 facing each other and bonding together, making the optical bonding apparatus 30 as a double-layered structure. The forth surface 324 is used for bonding to the rough Surface of the object (not shown).

Figure 3:
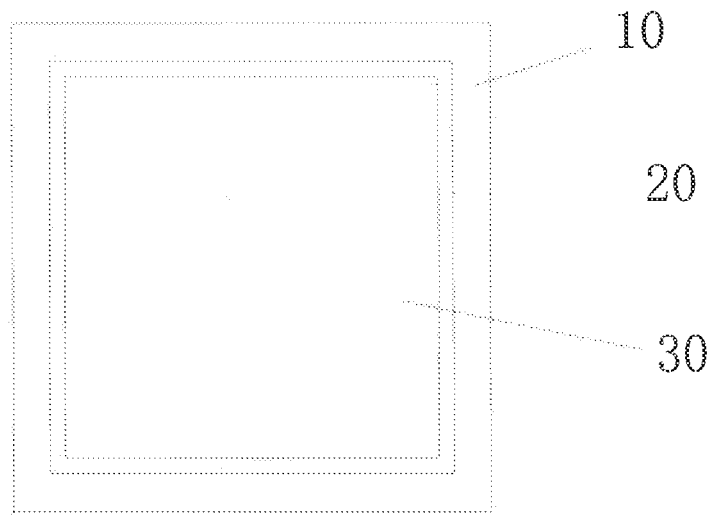
FIG. 3 shows a top view of the touch sensitive display using the optical bonding apparatus with multiple layer structure in accordance with a preferred embodiment of the present invention.
Figure 4:
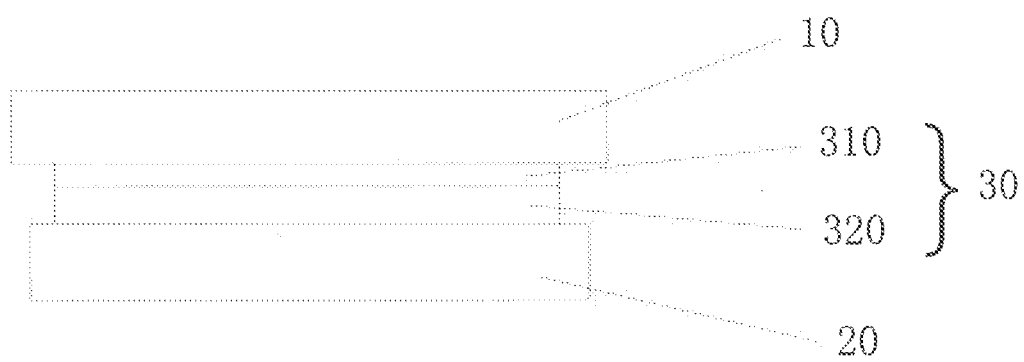
FIG. 4 shows a side view of a touch sensitive display using the optical bonding apparatus with multiple layer structure in accordance with a first preferred embodiment of the present invention.

FIG. 3 shows a top view of a touch sensitive display using the optical bonding apparatus 30 of the first embodiment. FIG. 4 shows a side view of the touch sensitive display using the optical bonding apparatus 30 of the first embodiment. The optical bonding apparatus 30 can be applied to the touch sensitive display. The touch sensitive display includes a touch panel 10 and an LCD panel 20 facing the touch panel 10. The optical bonding apparatus 30 is placed between the touch panel 10 and the LCD panel 20 for bonding the touch panel 10 and the LCD panel 20. In a preferred embodiment, the LCD panel 20 is the above mentioned object with a rough surface, and the fourth surface 324 of the thermal flow pressure sensitive bonding layer 320 bonds to the rough surface of the LCD panel 20.

In an alternative embodiment, the touch panel 10 is the above mentioned object with a rough surface. The optical bonding apparatus 30 is placed between the touch panel 10 and the LCD panel 20 for bonding the touch panel 10 and the LCD panel 20, wherein the fourth surface 324 of the thermal flow pressure sensitive bonding layer 320 bonds to the rough surface of the touch panel 10.

Figure 5:
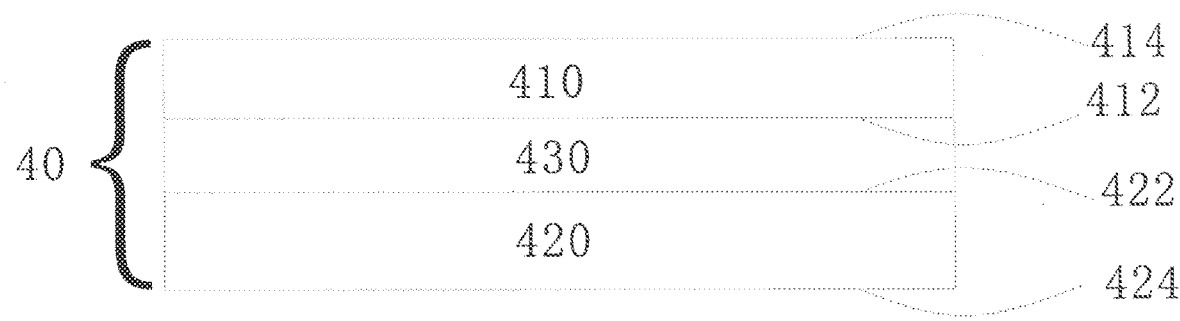
FIG. 5 shows a side view of an optical bonding apparatus with multiple layer structure in accordance with a second preferred embodiment of the present invention.

FIG. 5 shows a side view of an optical bonding apparatus with multiple layer structure according to a second embodiment of the present invention. In this embodiment, the optical bonding apparatus 40 includes a pressure sensitive bonding layer 410, a thermal flow pressure sensitive bonding layer 420 for bonding to a rough surface of an object (not shown), and an organic substrate 430 placed between the pressure sensitive bonding layer 410 and the thermal flow pressure sensitive bonding layer 420. Two surfaces of the organic substrate 430 adhere to the pressure sensitive bonding layer 410 and the thermal flow pressure sensitive bonding: layer 420 respectively, making the optical bonding apparatus 40 as a triple-layered structure.

The pressure sensitive bonding layer 410 has a first surface 412 and a second surface 414, the thermal flow pressure sensitive bonding layer 420 has a third surface 422 and a forth surface 424. The two surfaces of the organic substrate 430 adhere to the first surface 412 and the third surface 422 respectively, making the optical bonding apparatus 40 a triple-layered structure. The forth surface 424 of the thermal flow pressure sensitive bonding layer 420 is used for bonding to the rough surface of the object (not shown).

Figure 6:
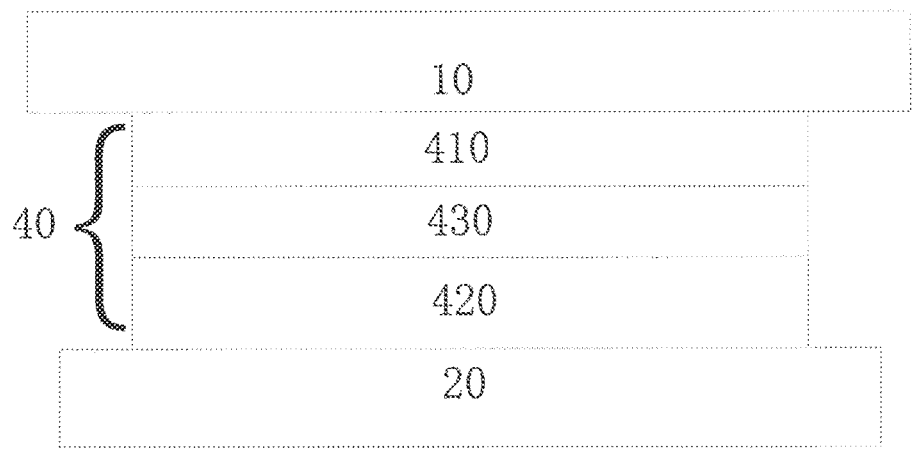
FIG. 6 shows a side view of a touch sensitive display using the optical bonding apparatus with multiple layer structure in accordance with the second preferred embodiment of the present invention.

FIG. 6 shows a side view of a touch sensitive display according to the second embodiment of the optical bonding apparatus 40. The optical bonding apparatus 40 can be applied to a touch sensitive display which includes a touch panel 10 and an LCD panel 20 facing the touch panel 10. The optical bonding apparatus 40 is placed between the touch panel 10 and the LCD panel 20 for bonding the touch panel 10 and the LCD panel 20. In a preferred embodiment, the LCD panel 20 is the above mentioned object with a rough surface, and the fourth surface 424 bonds to the rough surface of the LCD panel 20.

In an alternative embodiment, the touch panel 10 is the above mentioned object with a rough surface. The optical bonding apparatus 40 is placed between the touch panel 10 and the LCD panel 20 for bonding the touch panel 10 and the LCD panel 20. The fourth surface 424 bonds to the rough surface of the touch panel 10.

The second embodiment reduces the thickness of the pressure sensitive bonding layer 410 and in proves the die cutting feature (Die cutting is a manufacturing process used to generate large numbers of the same shape from a material such as wood, plastic, metal, or fabric.) of the optical bonding apparatus 40 by placing an organic substrate 430 between the pressure sensitive bonding layer 410 and the thermal flow pressure sensitive bonding layer 420. The thickness of the organic substrate 430 is 25 µm to 100 µm, and the thickness of the pressure sensitive bonding layer 410 is 25 µm to 50 µm. In a preferred embodiment, the material of the organic substrate 430 is polyethylene terephthalate, or the like.

The above mentioned pressure sensitive bonding layer and the thermal flow pressure sensitive bonding layer are both transparent in order to keep a better perspectivity while bonding to the touch sensitive display, and both surfaces of the pressure sensitive bonding layer and the thermal flow pressure sensitive bonding layer are adhesive.

The thermal flow pressure sensitive bonding layer is selected from the group consisting of thermoplastic type, thermal set type and thermal flow type.

The thermoplastic type Material has no viscidity or low viscidity while being in solid state at room temperature, and when it turns into liquid state, it has higher viscidity without changing its chemical feature when the temperature goes up to a certain value; it will return to solid state when the temperature comes down, and also it would turn into liquid state again if the temperature goes up again. The glass cement is the material of this kind.

The thermal set type material is in solid state at room temperature, and it turns into liquid state and has higher viscidity as the temperature goes up to a certain value, while its chemical feature also changes. It would return to solid state as the temperature comes down, but it will no longer change into liquid state again even if the temperature goes up again. The anisotropic conductive film (ACF) is the material of this kind.

The thermal flow type material is in solid state at room temperature, and it turns into half-liquid, half-solid state and has higher viscidity as the temperature goes up to a certain value, while its chemical feature also changes. It can return to solid state by adopting additional process such as ultra-violet (UV) solidifying, heating solidifying, vacuum anaerobic solidifying and moisture solidifying.

By adopting a heating process, it is easier to bond the thermal flow pressure sensitive bonding layer to the rough surface of the object and to cover the object completely. Because of the feature of the thermal flow pressure sensitive bonding layer, the rough surface can be filled to be flat, which makes the distance between the LCD panel and the touch panel even, as a result reducing or eliminating the development of the mura phenomenon.

The above mentioned pressure sensitive bonding layers 310, 410 have viscidity while being in solid state at room temperature, and it is very sensitive to pressure. It can bond to the surface of a substrate while being pressed without heating process, and it bonds tighter as the pressure increases.

A method for producing an optical bonding apparatus is provided as well. The method includes the following steps: providing a pressure sensitive bonding layer and superposing a thermal flow pressure sensitive bonding layer for bonding to a rough surface of an object on the pressure sensitive bonding layer. In a preferred embodiment, the superposing step is implemented by a heating process and the thermal flow pressure sensitive bonding layer is superposed on the pressure sensitive bonding layer via an organic substrate.

In addition, a method for assembling a display device is provided. The method includes the following steps: producing an optical bonding apparatus having a pressure sensitive bonding layer and a thermal flow pressure sensitive bonding layer bonded together, and placing the optical bonding apparatus between a touch panel and an LCD. More detailed processes of above method include: laminating the thermal flow pressure sensitive bonding layer on the rough surface of the touch panel; laminating the pressure sensitive bonding layer on the thermal flow pressure sensitive bonding layer; laminating the LCD panel on the pressure sensitive bonding layer. The three processes of laminating may be processed in any sequence. In another detailed processes of above method include: laminating the thermal flow pressure sensitive bonding layer on the rough surface of the LCD panel; laminating the pressure sensitive bonding layer on the thermal flow pressure sensitive bonding layer; laminating the LCD panel on the pressure sensitive bonding layer.

If the processes of laminating are processed at room temperature, there may be bubbles between layers after each laminating, so a process of autoclaving is added after each process of laminating. In other embodiments, the process of auto-claving added after the whole three processes of laminating.

In a preferred embodiment, the three processes of laminating are processed at 60° C.~85° C., which prevents generating bubbles in the process of laminating in a great extent.

After the above processes, a step of heating the lamination is needed to melt the thermal flow pressure sensitive bonding layer, so that the thermal flow pressure sensitive bonding layer can fill the rough surface of the touch panel or the LCD to be flat. The heating time is about 20 minutes to 1 hour depending on the heating temperature. When the rough surface is filled to be flat and the distance between the LCD panel and the touch panel is even, a step of solidifying the lamination is added. The solidifying process is implemented by exposing the lamination to ultra violet lights, the exposing energy depends on the feature of the bonding layer, and is generally 3000 mj.

In other embodiments, the pressure sensitive bonding layer and the thermal flow pressure sensitive bonding layer are bonded together by an organic substrate.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A touch sensitive display comprising:
   a touch panel;
   a liquid crystal display (LCD) panel facing the touch panel, wherein either the touch panel or the LCD panel has a rough surface; and
   an optical bonding apparatus placed between the touch panel and the LCD panel for bonding the touch panel and the LCD panel, the optical bonding apparatus comprising:
   a transparent pressure sensitive bonding layer;
   a transparent thermal flow pressure sensitive bonding layer; and
   an organic substrate placed between the transparent pressure sensitive bonding layer and the transparent thermal flow pressure sensitive bonding layer for bonding the transparent pressure sensitive bonding layer and the transparent thermal flow pressure sensitive bonding layer, wherein:
   the organic substrate is in direct contact with the transparent pressure sensitive bonding layer and the transparent thermal flow pressure sensitive bonding layer,
   the transparent pressure sensitive bonding layer has viscidity at room temperature and the transparent thermal flow pressure sensitive bonding layer has no viscidity at room temperature,
   the transparent thermal flow pressure sensitive bonding layer is configured to substantially uniformly contact the rough surface of the touch panel or the LCD panel,
   the transparent thermal flow pressure sensitive bonding layer fills a plurality of gaps on the rough surface of the touch panel or the LCD panel, and
   the transparent thermal flow pressure sensitive bonding layer is an anisotropic conductive film.

2. The touch sensitive display according to claim 1, wherein the rough surface is a surface of the LCD panel.

3. The touch sensitive display according to claim 2, wherein the transparent thermal flow pressure sensitive bonding layer completely covers the rough surface of the LCD panel.

4. The touch sensitive display according to claim 1, wherein the rough surface is a surface of the touch panel.

5. The touch sensitive display according to claim 4, wherein the transparent thermal flow pressure sensitive bonding layer completely covers the rough surface of the touch panel.

6. The touch sensitive display according to claim 1, wherein a material of the organic substrate is polyethylene terephthalate.

7. The touch sensitive display according to claim 1, wherein the organic substrate is 25 μm to 100 μm thick.

8. The touch sensitive display according to claim 1, wherein the transparent pressure sensitive bonding layer is 25 μm to 50 μm thick.

9. The touch sensitive display according to claim 1, wherein:
   the touch panel has a first width,
   the LCD panel has a second width different than the first width, and
   the optical bonding apparatus has a third width different than the first width and the second width.

* * * * *